United States Patent
Kobori

(10) Patent No.: US 12,134,430 B2
(45) Date of Patent: Nov. 5, 2024

(54) CORE BAR FOR ELASTIC CRAWLER AND ELASTIC CRAWLER USING CORE BAR

(71) Applicant: BRIDGESTONE CORPORATION, Tokyo (JP)

(72) Inventor: Tatsuya Kobori, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 655 days.

(21) Appl. No.: 17/277,800

(22) PCT Filed: Sep. 10, 2019

(86) PCT No.: PCT/JP2019/035491
§ 371 (c)(1),
(2) Date: Mar. 19, 2021

(87) PCT Pub. No.: WO2020/075432
PCT Pub. Date: Apr. 16, 2020

(65) Prior Publication Data
US 2021/0316802 A1    Oct. 14, 2021

(30) Foreign Application Priority Data
Oct. 9, 2018  (JP) ................. 2018-191072

(51) Int. Cl.
*B62D 55/24*  (2006.01)
(52) U.S. Cl.
CPC ................. *B62D 55/244* (2013.01)
(58) Field of Classification Search
CPC ............... B62D 55/244; B62D 55/24
See application file for complete search history.

(56) References Cited

FOREIGN PATENT DOCUMENTS

| JP | 11-268672 A | 10/1999 |
| JP | H11268672 A | * 10/1999 ........... B62D 55/253 |

(Continued)

OTHER PUBLICATIONS

International Search Report of PCT/JP 2019/035491 dated Nov. 5, 2019 [PCT/ISA/210].

(Continued)

*Primary Examiner* — S. Joseph Morano
*Assistant Examiner* — Eva L Comino
(74) *Attorney, Agent, or Firm* — Sughrue Mion, PLLC

(57) ABSTRACT

A core bar for an elastic crawler, the core bar having high durability against a twisting force acting on the core bar during use and an elastic crawler using the core bar are provided. A core bar 30 for an elastic crawler including a long core bar base 31, a pair of projection portions 32L, 32R that project at a center portion in a longitudinal direction of the core bar base 31, and a pair of rail portion 34L, 34R that project from the core bar base 31 on opposite outer sides of the pair of projection portions 32L, 32R and each include a track roller support surface 35 supporting a track roller 56 rolling on an inner circumferential surface of the elastic crawler 10, includes a pair of rail extension portions 36L, 36R that project from the core bar base 31 and each include a top surface 37 formed in such a manner as to continue from the track roller support surface 35, the top surface 37 extending from the rail portion 34L, 34R toward the center side in the longitudinal direction of the core bar base 31.

3 Claims, 7 Drawing Sheets

(56) References Cited

FOREIGN PATENT DOCUMENTS

| JP | 2000168646 A | * | 6/2000 | ........... B62D 55/253 |
|---|---|---|---|---|
| JP | 2006-027376 A | | 2/2006 | |
| JP | 200627376 A | * | 2/2006 | ........... B62D 55/253 |
| JP | 2006027376 | * | 2/2006 | ........... B62D 55/253 |
| JP | 2010006226 A | | 1/2010 | |
| JP | 2010215063 | * | 9/2010 | ........... B62D 55/253 |
| JP | 2010215063 A | * | 9/2010 | ........... B62D 55/253 |
| JP | 2012224161 | * | 11/2012 | ........... B62D 55/253 |
| JP | 2012224161 A | * | 11/2012 | ........... B62D 55/253 |

OTHER PUBLICATIONS

Extended European Search Report dated Apr. 14, 2022 in European Application No. 19871755.5.
International Preliminary Report on Patentability dated Apr. 8, 2021 with a Translation of the Written Opinion of the International Searching Authority in Application No. PCT/JP2019/035491.

* cited by examiner

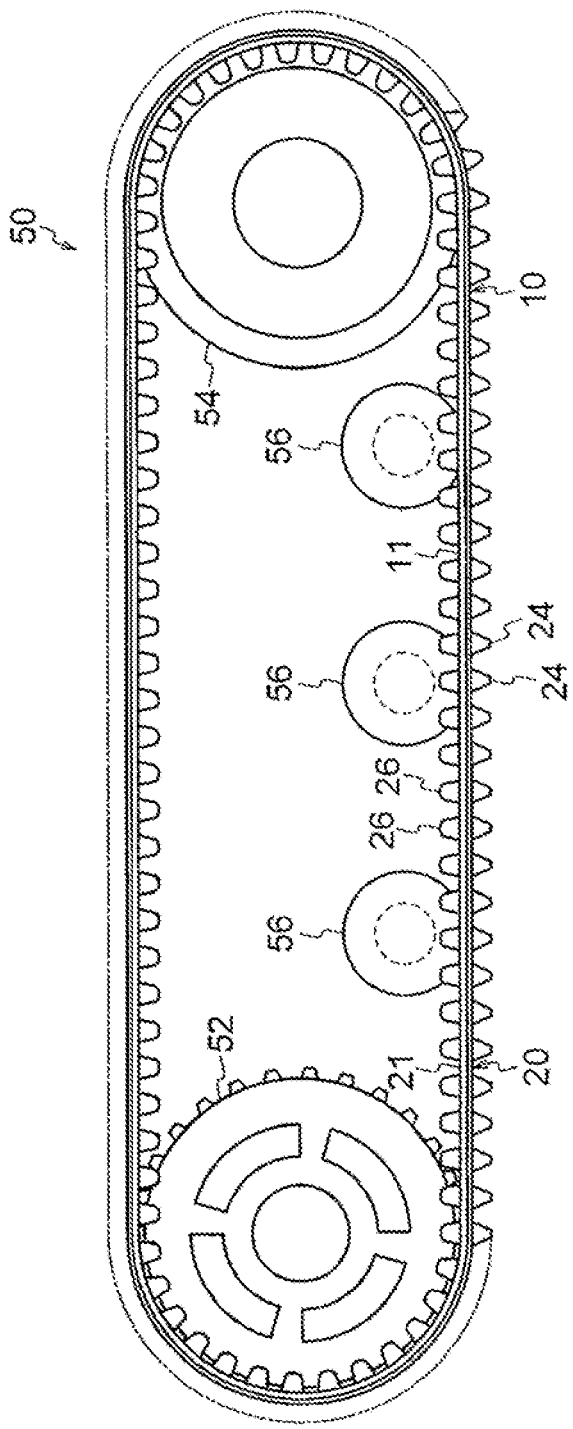
[Fig. 1]

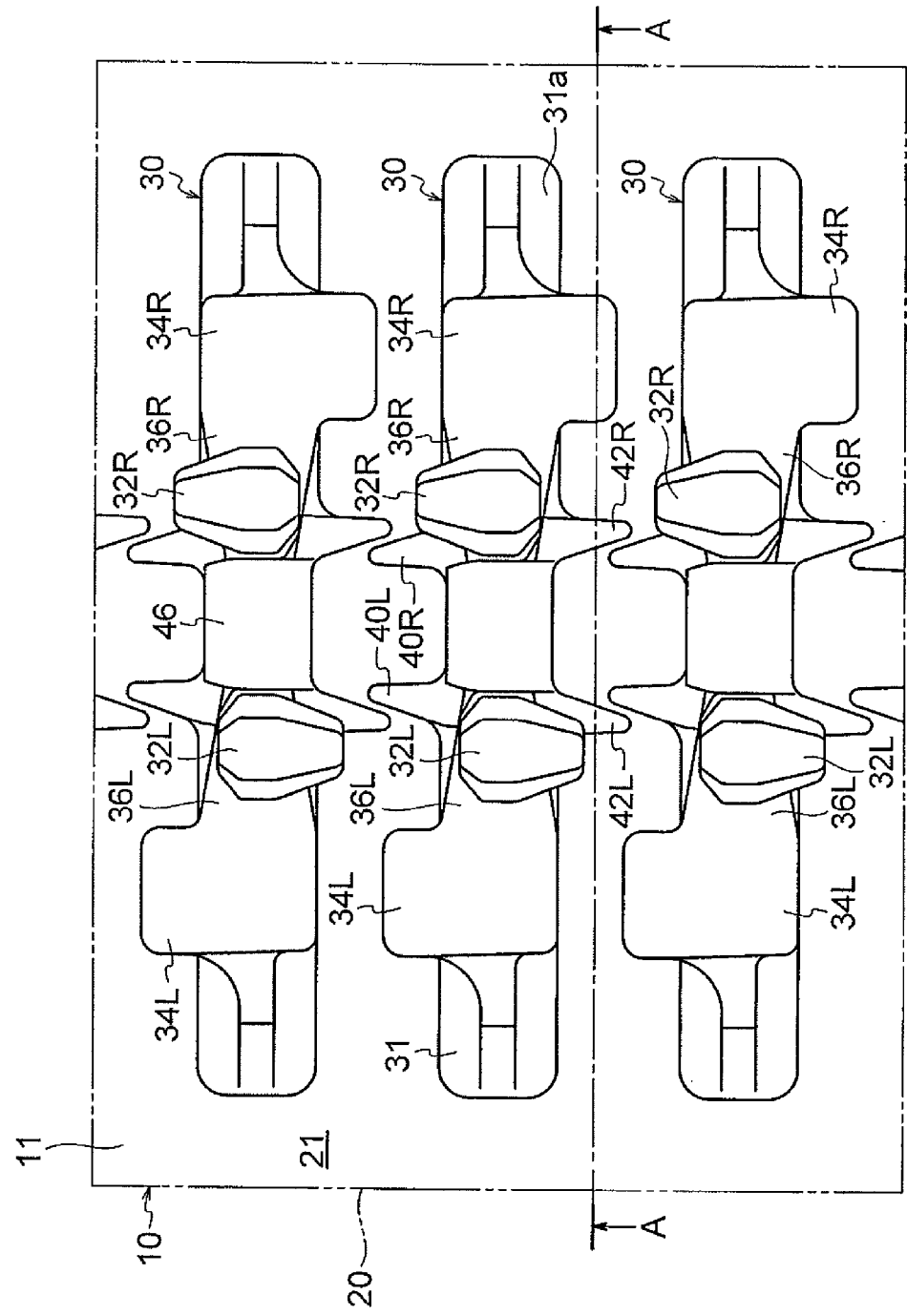
[Fig. 2]

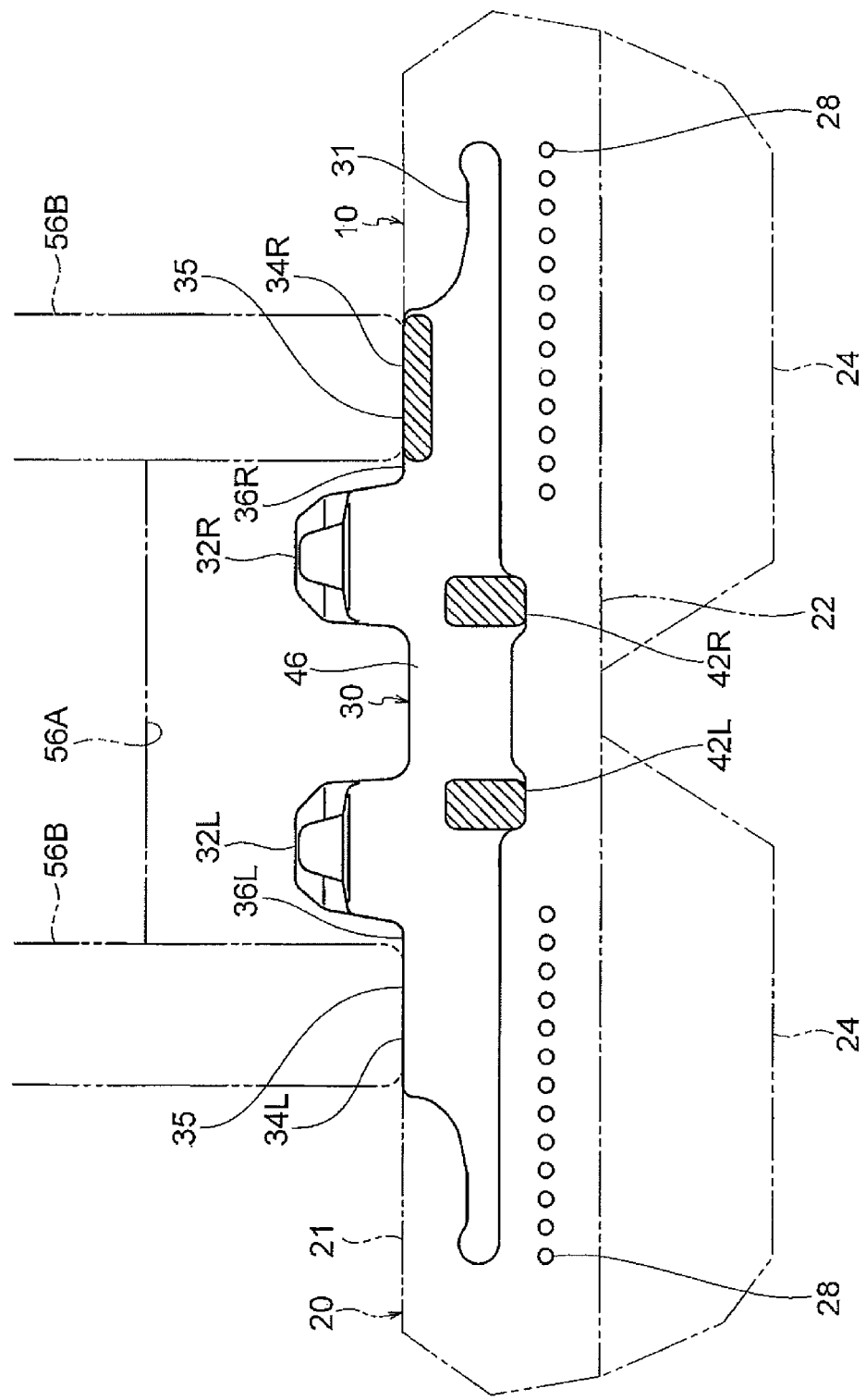
[Fig. 3]

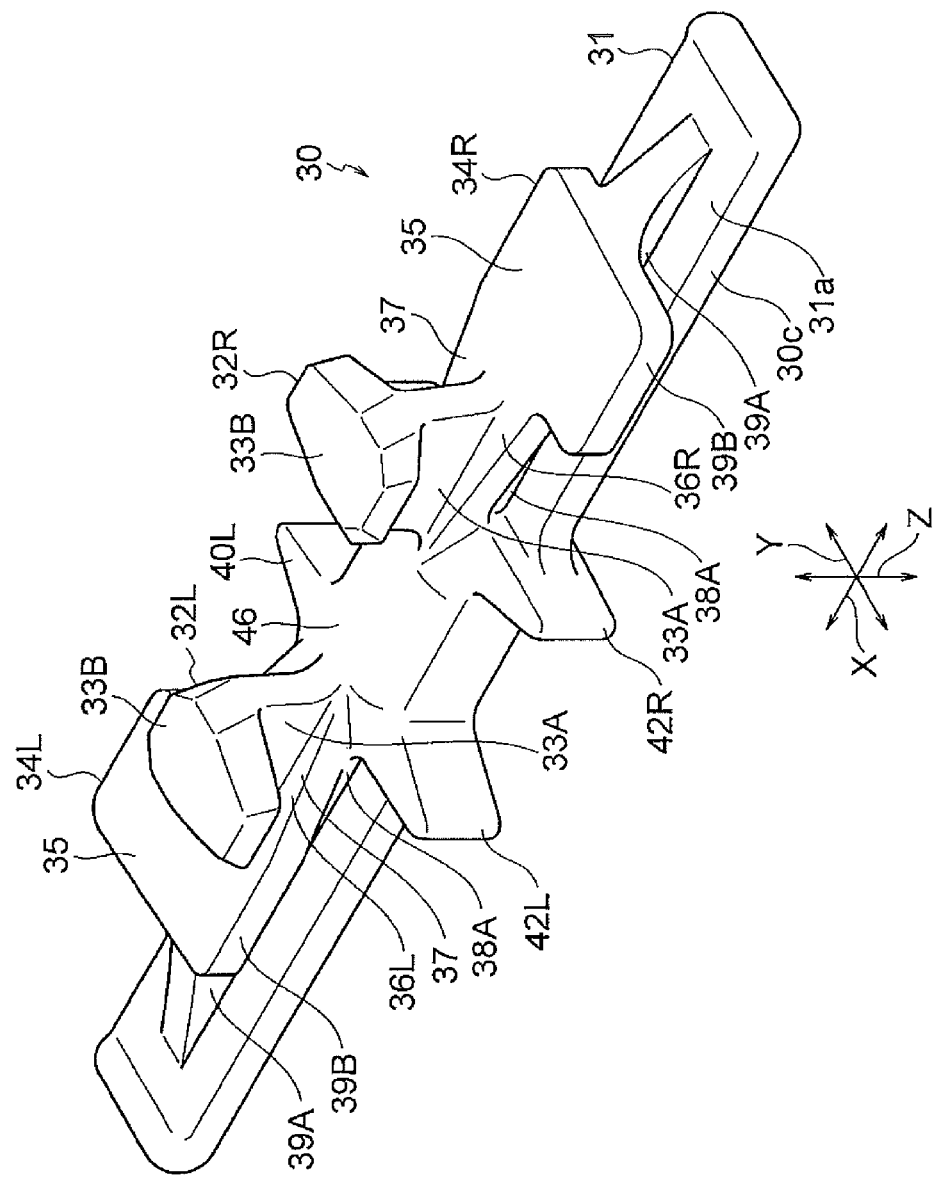
[Fig. 4]

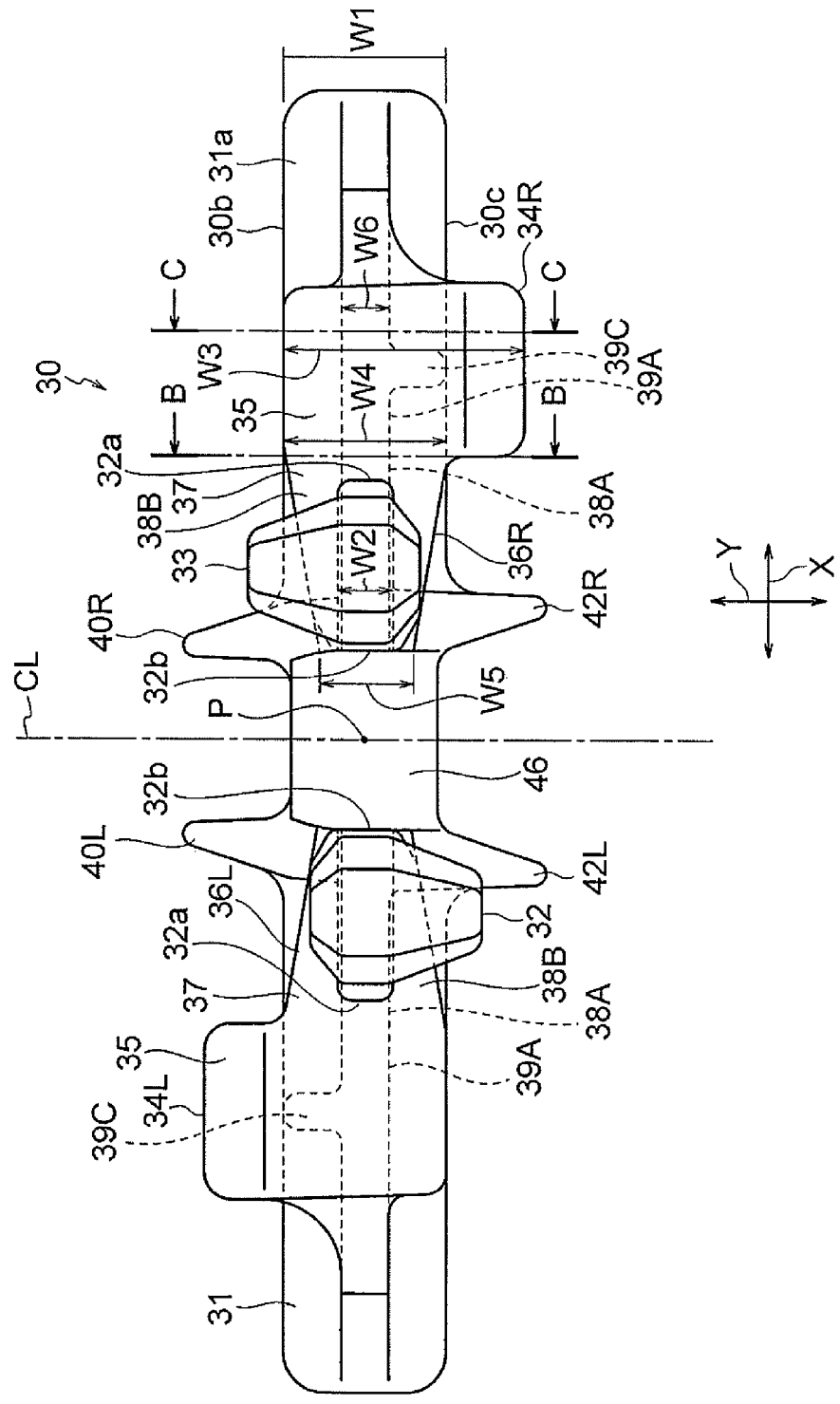
[Fig. 5]

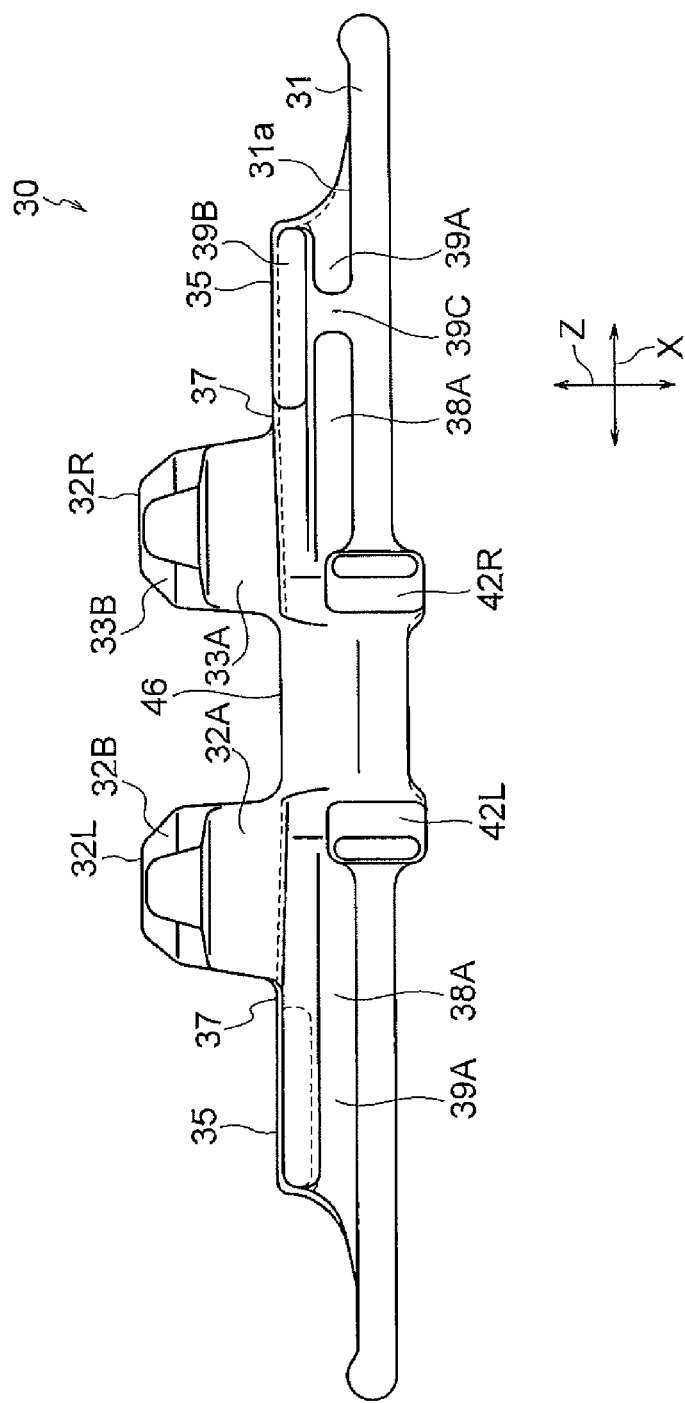
[Fig. 6]

[Fig. 7]
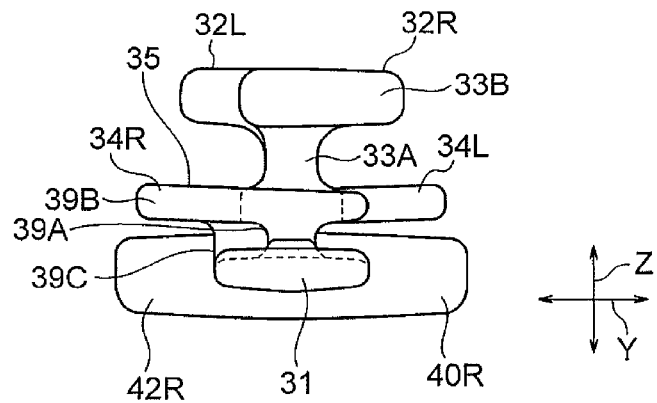
[Fig. 8]
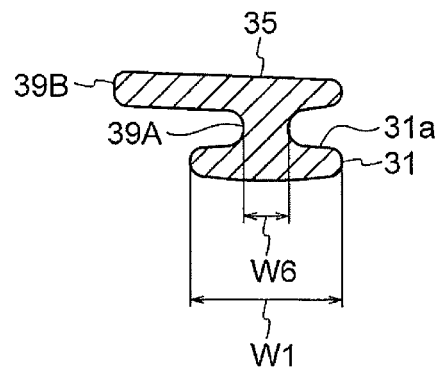
[Fig. 9]
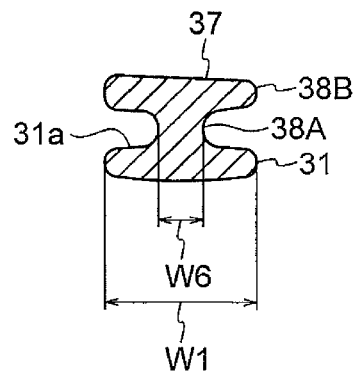

CORE BAR FOR ELASTIC CRAWLER AND ELASTIC CRAWLER USING CORE BAR

CROSS REFERENCE TO RELATED APPLICATIONS

This application is a National Stage of International Application No. PCT/JP2019/035491, filed Sep. 10, 2019, claiming priority to Japanese Patent Application No. 2018-191072, filed Oct. 9, 2018.

TECHNICAL FIELD

The present invention relates to a core bar for an elastic crawler and an elastic crawler with the core bar embedded therein.

BACKGROUND ART

In recent years, elastic crawlers have been widely used in travelling sections of agricultural machines, construction machines, civil engineering machines, etc. The elastic crawlers are generally formed in an endless belt-like shape using, e.g., rubber material. Such elastic crawlers are normally used in such a manner as to be wound around a drive wheel and track rollers of a travelling device, and each include a plurality of core bars, which are rigid members, embedded inside.

For example, the elastic crawler described in Patent Document 1 includes an endless belt-like elastic body and a plurality of core bars embedded inside the elastic body, and the core bars extend in a width direction of the elastic body and are embedded with predetermined spacing in a circumferential direction of the elastic body. Each core bar includes a long core bar base, a pair of projection portions that are located at a center portion in a longitudinal direction of the core bar base and project to the inner circumferential side of the elastic body, and a pair of rail portions that are located on opposite outer sides of a pair of projection portions and project to the inner circumferential side of the elastic body. The pair of rail portions each include a track roller support surface that supports a track roller, at a top portion, and the track roller support surface is larger in dimension in a core bar width direction than the core bar base.

In the elastic crawler described in Patent Document 1, because of the rail portions being provided, a distance between core bars adjacent to each other in an elastic crawler circumferential direction (length of an area in which no core bar is provided) is shorter in a track roller passage area in which a track roller passes than in other areas. Consequently, when a track roller rolls from one core bar to another core bar adjacent to the core bar, an amount of depression of the track roller to the ground side can be reduced, enabling suppressing shaking of the track roller.

PRIOR ART DOCUMENT

Patent Document

Patent Document 1: JP-A-2012-224161

SUMMARY OF INVENTION

Problem to be Solved by the Invention

If an elastic crawler is twisted as a result of driving over an obstacle such as a stone or travelling on an irregular surface, core bars embedded inside the elastic crawler are also twisted.

In a core bar including projection portions and rail portions, a twisting force acting on the core bar concentrates on connection portions located between the projection portions and the rail portions, the connection portions being smaller in width and strength than the projection portions and the rail portions, and thus, there is a need for a structure that is more durable against breakage of the core bar starting from the connection portions.

The present invention has been made in view of the aforementioned problem and an object of the present invention is to provide a core bar for an elastic crawler, the core bar having high durability against a twisting force acting during use, and an elastic crawler using the core bar.

Means for Solving the Problem

In order to achieve the above object, a core bar for an elastic crawler according to the present invention is a core bar for an elastic crawler, the core bar including: a core bar base that extends in a width direction of an endless belt-like elastic body and is embedded in the elastic body; a pair of projection portions that project to an inner circumferential surface side of the elastic body at a center portion in a longitudinal direction of the core bar base; and a pair of rail portions that project from the core bar base to the inner circumferential surface side of the elastic body on opposite outer sides of the pair of projection portions and each include a track roller support surface supporting a track roller rolling on the inner circumferential surface of the elastic body, wherein the core bar comprises a pair of rail extension portions that project from the core bar base to the inner circumferential surface side of the elastic body and each include a top surface formed in such a manner as to continue from the track roller support surface, the top surface extending from the rail portion toward the center side in the longitudinal direction of the core bar base.

With this configuration, a strength of parts between the rail portions and the projection portions can be enhanced by the rail extension portions each including a top surface formed in such a manner as to continue from the track roller support surface, the top surface extending from the rail portion to the center side in the longitudinal direction of the core bar base. Consequently, it is possible to enhance durability of the core bar against a twisting force, enabling preventing breakage of the core bar due to twisting.

Also, the invention provides the core bar for an elastic crawler, wherein the top surface of each rail extension portion extends from the rail portion to an end portion on the center side in the longitudinal direction of the projection portion.

With this configuration, it is possible to mitigate stress concentration occurring between the rail portions and the projection portions when a twisting force acts on the core bar, enabling more reliably preventing breakage of the core bar.

Also, the invention provides the core bar for an elastic crawler, wherein a dimension, in a width direction of the core bar base, of each rail extension portion decreases from the rail portion toward the projection portion side.

With this configuration, the dimension in the width direction of the rail extension portions is large at boundary portions that are boundaries with the rail portions, the boundary portions being easily broken by being twisted, enabling maintenance of high durability against twisting, and furthermore, making the dimension in the width direction decrease toward the respective projection portion sides enables suppressing an increase in weight of the core bar and thus enabling weight reduction.

Also, the invention provides the core bar for an elastic crawler, comprising an upright portion that is located between the track roller support surface of each rail portion and the top surface of the rail extension portion, and the core bar base, and continues from the core bar base, wherein a dimension, in the width direction of the core bar base, of the upright portion is smaller than a width dimension of the core bar base.

With this configuration, it is possible to make the upright portions be recessed relative to the core bar base in the width direction of the core bar base, enabling an elastic material forming the elastic body enter the recessed parts and thus enabling enhancement in adhesion between the core bar and the elastic body.

Also, the elastic crawler comprises: an endless belt-like elastic body; and a plurality of the core bars for an elastic crawler, the core bars being embedded with spacing in a circumferential direction of the elastic body in such a manner as to extend in the width direction of the elastic body.

With this configuration, the strength of the parts between the rail portions and the projection portions of the core bar can be enhanced by the rail extension portions formed in each of the core bars for an elastic crawler, enabling enhancement in durability of the core bar against a twisting force, and thus, it is possible to, if a twisting force acts on the core bar as a result of the elastic crawler driving over an obstacle or travelling on an irregular surface, suppress breakage of the core bar due to the twisting force.

Effects of Invention

A core bar for an elastic crawler and an elastic crawler according to the present invention enable enhancement in durability of a core bar against a twisting force acting during use.

BRIEF DESCRIPTION OF DRAWINGS

FIG. 1 is a side view schematically illustrating a travelling device using an elastic crawler that is an embodiment of the present invention.
FIG. 2 is a plan view illustrating an inner circumferential portion of the elastic crawler.
FIG. 3 is a sectional view along line A-A in FIG. 2.
FIG. 4 is a perspective view of a core bar for an elastic crawler.
FIG. 5 is a plan view of the core bar for an elastic crawler.
FIG. 6 is a front view of the core bar for an elastic crawler.
FIG. 7 is a side view of the core bar for an elastic crawler.
FIG. 8 is a sectional view along line C-C in FIG. 5.
FIG. 9 is a sectional view along line B-B in FIG. 5.

MODE FOR CARRYING OUT THE INVENTION

A core bar for an elastic crawler (hereinafter simply referred to as "core bar") and an elastic crawler using the core bar according to the present invention will be described below. FIG. 1 is a side view schematically illustrating a travelling device 50 using an elastic crawler 10 that is an embodiment of the present invention. FIG. 2 is a plan view illustrating an inner circumferential portion of the elastic crawler. FIG. 3 is a sectional view along line A-A in FIG. 2. In FIGS. 2 and 3, a crawler body 20, which is an elastic body, is illustrated by alternate long and two short dashes lines and a core bar 30 is illustrated by solid lines. The elastic crawler 10 is installed on a travelling device 50, for example, an agricultural machine, a construction machine or a civil engineering machine.

In the travelling device 50, the elastic crawler 10 is used in such a manner as to be wound around a sprocket 52, which is a drive wheel, an idler 54, which is a driven wheel, and a plurality of track rollers 56. Each track roller 56 rolls on a track roller passage surface formed in an inner circumferential surface 11 of the elastic crawler 10.

The elastic crawler 10 includes a crawler body (elastic body) 20 formed in an endless belt-like shape by an elastic material, and a plurality of core bars 30 embedded with predetermined spacing in a circumferential direction of the crawler body 20.

The crawler body 20 includes a plurality of lugs 24 projecting from an outer circumferential surface 22. The lugs 24 are formed with predetermined spacing in a circumferential direction of the outer circumferential surface 22. Note that a shape, a width (length in a circumferential direction of the elastic crawler 10), a pattern, etc., of the lugs 24 can appropriately be set according to usage of the elastic crawler 10.

As illustrated in FIGS. 2 to 6, each core bar 30 includes a long core bar base 31 embedded in the crawler body 20, a pair of projection portions 32L, 32R located at a center portion in a longitudinal direction of the core bar base 31, a pair of rail portion 34L, 34R located on opposite outer sides of the pair of projection portions 32L, 32R, and a pair of rail extension portions 36L, 36R formed between the rail portions 34L, 34R and the projection portions 32L, 32R.

The core bar base 31 is formed in a substantially rectangular shape in plan view. The pair of projection portions 32L, 32R, the pair of rail portions 34L, 34R and the pair of rail extension portions 36L, 36R each projects from an upper surface 31a (surface facing the inner circumferential surface 21 side of the crawler body 20 in a state in which the core bar base 31 is embedded in the crawler body 20) of the core bar base 31. An engagement portion 46 that engages with the sprocket 52 is formed between the pair of projection portions 32L, 32R.

In the below description, a longitudinal direction of the core bar 30 (arrow X direction in FIG. 4) is simply referred to as "longitudinal direction" and a width direction of the core bar 30 (arrow Y direction in FIG. 4) is referred to as "core bar width direction" and a thickness direction of the core bar 30 (arrow Z direction in FIG. 4) is referred to as "core bar thickness direction". The X direction, the Y direction and the Z direction are orthogonal to one another. The core bar 30 further includes a pair of first restricting projections 40L, 40R at one side surface 30b in the core bar width direction and a pair of second restricting projections 42L, 42R at another side surface 30c. The core bar 30 is generally one formed of metal via means such as casting or forging, but may be one formed of hard resin or a sheet metal.

In the present embodiment, as illustrated in FIG. 5, the pair of projection portions 32L, 32R, the pair of rail portions 34L, 34R and the pair of rail extension portions 36L, 36R are formed in such a manner as to be symmetrical to each other with respect to a center point P of the core bar 30 in plan view, respectively; however, the present invention is not limited to this example and the pair of projection portions 32L, 32R, the pair of rail portions 34L, 34R and the pair of rail extension portions 36L, 36R may be each formed in such a manner as to be symmetrical to each other with respect to a center line CL of the core bar 30. The pair of first restricting projections 40L, 40R and the pair of second restricting projections 42L, 42R are each formed in such a manner as to be symmetrical with respect to the center line CL. In the below description, of the paired projection portions 32L, 32R, the paired rail portions 34L, 34R and the paired rail extension portions 36L, 36R, one projection portion 32R, one rail portion 34R and one rail extension portion 36R will be described in detail, and parts of the other projection portion 32L, the other rail portion 34L and the other rail extension portion 36L, the parts corresponding to those of the projection portion 32R, the rail portion 34R and the rail extension portion 36R, are provided with reference numerals that are the same as those of the projection portion 32R, the rail portion 34R and the rail extension portion 36R, and detailed description thereof will be omitted.

The projection portion 32R includes a base portion 33A that continues from the core bar base 31 and a head portion 33B that projects from the base portion 33A in the core bar width direction. As illustrated in FIGS. 4 and 5, a dimension W2 in the core bar width direction of the base portion 33A is smaller than a width dimension W1 of the core bar base 31 and a dimension in the core bar width direction of the head portion 33B is substantially equal to a width dimension W1 of the core bar base.

The rail portion 34R is formed in an area in which the track rollers 56 pass when the elastic crawler 10 travels. As illustrated in FIGS. 7 and 8, the rail portion 34R includes an upright portion 39A that continues from the core bar base 31 and a top portion 39B that projects from the upright portion 39A in the core bar width direction and includes a track roller support surface 35 that supports a track roller 56, at the top portion 39B. The track roller support surface 35 is formed in a substantially planar shape at a position that is lower than the head portion 33B of the projection portion 32R (that is, a position at which the base portion 33A is present in the core bar thickness direction), and as illustrated in FIG. 5, has a dimension W3 in the core bar width direction that is set to be larger than the width dimension W1 of the core bar base 31. The track roller support surface 35 of the present embodiment is formed in a rectangular shape that is long in the core bar width direction in plan view. The rail portion 34R further includes a rib 39C that projects from the upper surface 31a of the core bar base 31 and supports the top portion 39B. The rib 39C extends from one side surface in the core bar width direction of the upright portion 39A (more specifically, a side surface on the side on which a part of the track roller support surface 35 projects relative to the core bar base 31) in the core bar width direction in the plan view illustrated in FIG. 5.

As illustrated in FIG. 3, each track roller 56 includes a shaft portion 56A rotatably supported on the travelling device 50 and wheel portions 56B fixed to opposite end portions in an axis direction of the shaft portion 56A, and the wheel portions 56B roll on the track roller support surfaces 35.

The rail extension portion 36R is formed between the rail portion 34R and the projection portion 32R. As illustrated in FIGS. 7 and 9, the rail extension portion 36R includes an upright portion 38A that continues from the core bar base 31 and a top portion 38B that projects from the upright portion 38A in the core bar width direction. A top surface 37 of the rail extension portion 36R, which is formed at the top portion 38B, continues from the track roller support surface 35, and in the present embodiment, is substantially flush with the track roller support surface 35.

The top surface 37 of the rail extension portion 36R extends from the rail portion 34R toward the center side in the longitudinal direction of the core bar base 31. The top surface 37 extends from the rail portion 34R preferably to the center line CL side (that is, the center side in the longitudinal direction of the core bar base 31) relative to a proximal end 32a of the projection portion 32R, more preferably to an end portion on the center line CL side of the projection portion 32R. In the present embodiment, the top surface 37 extends from the rail portion 34R to a distal end 32b of the projection portion 32R. In the present embodiment, as illustrated in FIGS. 4 and 5, a dimension in the core bar width direction of the top surface 37 decreases from the rail portion 34R toward the projection portion 32R side, a maximum dimension W4 of the top surface 37 is set to be substantially equal to the width dimension W1 of the core bar base 31 and a minimum dimension W5 of the top surface 37 is set to be substantially equal to or larger than the dimension in the core bar width direction of the base portion 33A of the projection portion 32R.

As illustrated in FIGS. 5 and 6, the upright portion 39A of the rail portion 34R and the upright portion 38A of the rail extension portion 36R are located at a center portion in the core bar width direction of the core bar base 31 and are linearly continuous with each other in the longitudinal direction of the core bar 30. A dimension W6 in the core bar width direction of the upright portions 38A, 39A is smaller than the width dimension W1 of the core bar base 31.

The first restricting projections 40L, 40R are paired with the engagement portion 46 therebetween and the second restricting projections 42L, 42R are paired with the engagement portion 46 therebetween. The first restricting projections 40L, 40R and the second restricting projections 42L, 42R are tapered and a distance between tip portions of the second restricting projections 42L, 42R is larger than that of the first restricting projections 40L, 40R.

In a state in which the core bar 30 is embedded in the crawler body 20, the core bar 30 is disposed in such a manner that: the core bar base 31 extends in a width direction of the crawler body 20; and the engagement portion 46, the projection portions 32L, 32R, the rail portions 34L, 34R and the rail extension portions 36L, 36R are covered by the elastic material forming the crawler body 20 and face the inner circumferential surface 21 side of the crawler body 20. As illustrated in FIG. 1, the pair of projection portions 32L, 32R form elastic projections 26 that project from the inner circumferential surface 11 of the elastic crawler 10. The circumferential direction and a width direction of the elastic crawler 10 (that is, the circumferential direction and the width direction of the crawler body 20) are orthogonal to each other. In a state in which the core bar 30 is embedded, the core bar thickness direction coincides with a thickness direction of the elastic crawler 10 and the longitudinal direction of the core bar 30 coincides with the width direction of the elastic crawler 10.

As already described, the plurality of core bars 30 are disposed in such a manner as to be spaced in the circumferential direction of the crawler body 20, and as illustrated in FIG. 2, core bars 30 adjacent to each other in the circumferential direction are disposed in such a manner that on the outer sides in the crawler width direction of the first restricting projections 40L, 40R of one core bar 30, the second restricting projections 42L, 42R of the other core bar 30 are disposed. Such disposition enables restriction of movement in the crawler width direction of the core bars 30.

Each core bar 30 can be disposed in such a manner that the core bar base 31 entirely or partly overlaps with lugs 24 in the thickness direction. Also, instead of this disposition, each core bar 30 may be disposed in such a manner that the core bar base 31 does not overlap with lugs 24 in the thickness direction.

As illustrated in FIG. 3, in the crawler body 20, on the crawler body 20 outer circumferential surface 22 side of the core bar 30, an endless belt-like reinforcement layer 28 extending in the crawler circumferential direction is embedded on opposite sides in the crawler width direction across the engagement portion 46 located between the pair of projection portions 32L, 32R. The reinforcement layer 28 is formed by covering with rubber a single reinforcement cord helically wound along the crawler circumferential direction or a plurality of reinforcement cords arranged in parallel along the crawler circumferential direction. For the reinforcement cord(s), for example, a steel cord having good tensile strength or a cord formed of, e.g., organic fiber can be used.

In the elastic crawler 10 using the above-described core bars 30, a strength of parts between the rail portions 34L, 34R and the projection portions 32L, 32R of each core bar 30 can be enhanced by the rail extension portions 36L, 36R, enabling enhancement in durability against a twisting force acting on the core bar 30 as a result of the elastic crawler 10 driving over an obstacle such as a stone. Consequently, it is possible to prevent breakage of the core bar 30 due to twisting. Also, the top surfaces 37 of the rail extension portions 36L, 36R are flush with the respective track roller support surfaces 35, enabling mitigation of stress concentration occurring in respective boundary portions that are boundaries with the rail portions 34L, 34R, the boundary portions being easily broken by being twisted.

Also, a dimension in the core bar width direction of the rail extension portions 36L, 36R decreases from the rail portions 34L, 34R toward the respective projection portion 32L, 32R sides, enabling suppressing an increase in weight of the core bar 30 and thus enabling weight reduction while ensuring necessary strength against twisting. In particular, the width dimension of the rail extension portion 36L, 36R is large at the boundary portions that are boundaries with the rail portions 34L, 34R, from which breakage due to twisting easily starts, enabling maintenance of high durability against twisting.

Also, the upright portions 38A, 39A, which have a smaller dimension in the core bar width direction than the top portions 38B of the rail extension portions 36L, 36R and the top portions 39B of the rail portion 34L, 34R, are formed between the top portions 38B and the top portions 39B, and the core bar base 31 to make the upright portions 38A, 39A be recessed relative to the core bar base 31, enabling the elastic material forming the crawler body 20 to enter the recessed parts. Consequently, the area of contact between the core bar 30 and the crawler body 20 can be increased, enabling enhancement in adhesion between the core bar 30 and the crawler body 20. Also, it is possible to suppress an increase in weight of the core bar 30 and thus reduce the weight.

Note that: the present invention is not limited to the above-described embodiment; and various changes are possible without departing from the spirit of the invention.

For example, the dimension in the core bar width direction of the rail extension portions 36L, 36R of each core bar 30 may be substantially constant without changing from the rail portions 34L, 34R toward the respective projection portion 32L, 32R sides.

REFERENCE SIGNS LIST 10 elastic crawler
20 crawler body
24 lug
30 core bar
31 core bar base
32L, 32R projection portion
34L, 34R rail portion
35 track roller support surface
36L, 36R rail extension portion
37 top surface
38A upright portion of rail extension portion
38B top portion of rail extension portion
39A upright portion of rail portion
39B top portion of rail portion
40L, 40R first restricting projection
42L, 42R second restricting projection
50 travelling device
56 track roller

The invention claimed is:

1. A core bar for an elastic crawler, the core bar including:
    a core bar base that extends in a width direction of an elastic endless belt body and is embedded in the elastic body;
    a pair of projection portions that project to an inner circumferential surface side of the elastic body at a center portion in a longitudinal direction of the core bar base; and
    a pair of rail portions that project from the core bar base to the inner circumferential surface side of the elastic body on opposite outer sides of the pair of projection portions and each include a track roller support surface supporting a track roller rolling on the inner circumferential surface of the elastic body,
    wherein the core bar comprises a pair of rail extension portions that project from the core bar base to the inner circumferential surface side of the elastic body and each include a top surface formed in such a manner as to continue from the track roller support surface, the top surface extending from the rail portion toward the center side in the longitudinal direction of the core bar base,
    wherein in each of the rail extension portions, the top surface of the rail extension portion is formed on both sides in the width direction of the core bar with the base sandwiched therebetween, and the top surface formed on the both sides extend from the rail portion to a distal end on the center side in the longitudinal direction of the projection portion, and
    wherein the projection portion incudes a head portion and a base portion having smaller dimension in the core bar width direction than the head portion, and in each of the rail extension portions, a dimension in the core bar width direction of the rail extension portion including the base portion and top surfaces on both sides thereof decreases from the rail portion toward the end portion.

2. The core bar for the elastic crawler according to claim 1, comprising an upright portion that is located between the track roller support surface of each rail portion and the top surface of the rail extension portion, and the core bar base, and continues from the core bar base,
    wherein a dimension, in the width direction of the core bar base, of the upright portion is smaller than a width dimension of the core bar base.

3. The elastic crawler comprising:
    an elastic endless belt body; and
    a plurality of the core bars for the elastic crawler according to claim 1, the core bars being embedded with spacing in a circumferential direction of the elastic body in such a manner as to extend in the width direction of the elastic body.

* * * * *